(12) United States Patent
Nishikawa

(10) Patent No.: US 6,623,999 B1
(45) Date of Patent: Sep. 23, 2003

(54) MICROLENS ARRAY SUBSTRATE, METHOD OF MANUFACTURING THE SAME, AND DISPLAY DEVICE

(75) Inventor: Takao Nishikawa, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/462,733

(22) PCT Filed: May 10, 1999

(86) PCT No.: PCT/JP99/02409

§ 371 (c)(1),
(2), (4) Date: Jan. 11, 2000

(87) PCT Pub. No.: WO99/59004

PCT Pub. Date: Nov. 18, 1999

(30) Foreign Application Priority Data

May 11, 1998 (JP) ............................................. 10-145108
Sep. 14, 1998 (JP) ............................................. 10-279439

(51) Int. Cl.⁷ ........................ H01L 21/00; H01L 33/00; G02F 1/1335; G02F 1/1337
(52) U.S. Cl. ............................. 438/29; 438/27; 438/30; 438/65; 438/69; 257/91; 257/98; 257/88; 349/95; 349/123; 349/129
(58) Field of Search .................... 438/30, 29, 27, 438/65, 69; 257/91, 98, 88; 349/95, 122, 123, 129

(56) References Cited

U.S. PATENT DOCUMENTS 5,808,712 A * 9/1998 Hishida et al. ................ 349/95
6,046,787 A * 4/2000 Nishiguchi ................... 349/129
6,108,063 A * 8/2000 Yuuki et al. ................... 349/95

FOREIGN PATENT DOCUMENTS

| JP | 3-198003 | 8/1991 |
| JP | 07-281181 | 10/1995 |
| JP | 10-039112 | 2/1998 |
| JP | 10-104405 | 4/1998 |

* cited by examiner

Primary Examiner—Olik Chaudhuri
Assistant Examiner—Neal Berezny
(74) Attorney, Agent, or Firm—Harness, Dickey & Pierce, P.L.C.

(57) ABSTRACT

A method of manufacturing a microlens array substrate is provided comprising the steps of: closely providing a substrate precursor (30) between a first master mold (10) having a plurality of curved surfaces (12) and a second master mold (20) having a plurality of projections (22) to form a substrate (32) having a plurality of lenses (34) formed by the curved surfaces (12) and recesses (36) formed by the projections (22); removing the first and second master molds (10, 20) from the substrate (32); and filling the recesses (36) with a shading material (42) after the second master mold (20) is removed.

13 Claims, 14 Drawing Sheets

$na > nb$

MICROLENS ARRAY SUBSTRATE, METHOD OF MANUFACTURING THE SAME, AND DISPLAY DEVICE

TECHNICAL FIELD

The present invention relates to a microlens array substrate, a method of manufacturing the same, and a display device.

BACKGROUND ART

A microlens array formed by a number of micro lenses arranged side by side has been applied to liquid crystal panels, for example. Each lens of the microlens array converges incident light upon each pixel to illuminate a display screen.

As a method of manufacturing a microlens array, methods using dry etching or wet etching have been known. However, these methods require a lithographic step each time when manufacturing an individual microlens array, thereby leading to increased costs.

Therefore, a method of manufacturing a microlens array by dripping a liquid resin onto a master mold having curved surfaces corresponding to lenses and removing the solidified resin has been developed as disclosed in Japanese Patent Application Laid-Open No. 3-198003.

A microlens array illuminates a display screen, but contrast between pixels is not improved by a conventional microlens array. A means for improving contrast is required in addition to a microlens array in order to provide a bright and vivid display on the screen. However, a conventional method of manufacturing a microlens array has given no attention to the improvement of contrast.

The present invention has been achieved to solve the above problem, and an objective of the present invention is to provide a microlens array substrate capable of improving contrast in addition to illuminating a screen, a method of manufacturing the same, and a display device.

SUMMARY OF THE INVENTION (1) A method of manufacturing a microlens array substrate according to the present invention comprises the steps of:

closely providing a substrate precursor between a first master mold having a plurality of curved surfaces and a second master mold having a plurality of projections to form a substrate having a plurality of lenses formed by the curved surfaces and recesses formed by the projections;

removing the first and second master molds from the substrate; and filling the recesses with a shading material after the second master mold is removed.

According to the present invention, the substrate precursor is closely placed between the first and second master molds and the lenses are formed by transferring the shapes of the curved surfaces of the first master mold. A microlens array substrate having a plurality of lenses can be thus easily formed. Because each lens converges incident light, a display screen can be brightly illuminated. Moreover, because the first and second master molds can be used repeatedly as long as durability permits, the step of producing these master molds can be omitted in the steps of manufacturing the second and subsequent microlens array substrates, thereby reducing the number of steps and production costs.

The recesses are formed on the microlens array substrate by transferring the shapes of the projections of the second master mold, and the recesses are filled with the shading material. The shading material functions as a black matrix to improve contrast between pixels.

According to the present invention, a microlens array substrate capable of improving contrast in addition to illuminating brightly a display screen can be easily manufactured by transferring.

(2) In this manufacturing method, the substrate precursor may be closely placed between the first and second master molds such that each of the projections avoids being positioned right above the center of each of the curved surfaces.

Since each of the recesses on the microlens array substrate avoids being positioned right above the center of each of the lenses, a black matrix can be formed so as to avoid the center of the lenses.

(3) This manufacturing method may further comprise a step of forming a protective film by placing a protective film precursor on at least one of the shading material in the recesses and the lenses, and by solidifying the protective film precursor.

(4) The protective film precursor may be of a material which can be cured by applying energy.

(5) The energy may be at least one of light and heat.

(6) The protective film precursor may be a UV-curable resin.

(7) In this manufacturing method, the protective film precursor may be solidified after placing a reinforcing plate on the protective film precursor.

(8) The substrate precursor may be of a material which can be cured by applying energy.

By using such a material, the substrate precursor can be easily provided to minute parts of the first and second master molds, and so a microlens array substrate formed by precisely transferring the shapes of the curved surfaces and projections of the first and second master molds can be provided.

(9) The energy may be at least one of light and heat.

Therefore, a commonly used exposure apparatus, baking furnace, or hot plate can be used, thereby reducing facility costs and space.

(10) The substrate precursor may be a UV-curable resin.

As the UV-curable resin, an acrylic resin is preferable -because of superior transparency and availability of various commercial resins and photosensitizers

(11) In this manufacturing method, the recesses may be filled with the shading material by an ink jet method.

According to the ink jet method, the shading material can be provided at a high speed with no waste.

(12) In this manufacturing method, at least part of an inner surface of each of the recesses may be tapered such that an opening portion is wider than a bottom portion.

Since the tapered recesses can be reliably filled with the shading material, thus produced microlens array substrate is particularly suitable for a liquid crystal panel with high resolution.

(13) In this manufacturing method, only the opening portion of the inner surface may be tapered.

Such recesses permit only a small difference in thickness of the shading material, thereby ensuring uniform shading performance. The microlens array thus manufactured can provide a vivid image.

(14) A microlens array substrate according to the present invention comprises: a plurality of lenses formed on one surface of the microlens array substrate; a plurality of recesses formed on the other surface of the microlens array substrate such that each of the recesses avoids being positioned right above the center of each of the lenses; and a shading layer formed in the recesses.

According to the present invention, each lens converges incident light upon each pixel to brightly illuminate a display screen, and the shading layer formed in the recesses functions as a black matrix to improve contrast between pixels.

(15) The microlens array substrate may further comprise a protective film on at least one of the lenses and the shading layer.

(16) The microlens array substrate may further comprise a reinforcing plate on the protective film.

(17) In the microlens array substrate, at least part of an inner surface of each of the recesses may be tapered such that an opening portion is wider than a bottom portion.

Because the opening portion is wider than the bottom portion and the recesses can be reliably filled with the shading material, the microlens array substrate is particularly suitable for a liquid crystal panel with high resolution.

(18) In the microlens array substrate, only the opening portion of the inner surface may be tapered.

Such recesses permit only a small difference in thickness of the shading material, thereby ensuring uniform shading performance, and a vivid image can be provided.

(19) A microlens array substrate according to the present invention is manufactured by the above-described method.

(20) A display device according to the present invention comprises the above-described microlens array substrate and a light source which emits light toward the microlens array substrate, wherein the microlens array substrate is placed such that a surface on which the lenses are formed faces the light source.

(21) The relation between the light refractive index "na" of the material forming the microlens array substrate and the light refractive index "nb" outside the lenses may be "na>nb", when the lenses are convex lenses.

When light passes from a medium with a lower refractive index to a medium with a higher refractive index, the light is refracted to a direction approaching the normal line of the interface between the two media. When the relation between "na" and "nb" satisfies "na>nb", the incident light can be converged by using convex lenses.

(22) The relation between the light refractive index "na" of the material forming the microlens array substrate and the light refractive index "nb" outside the lenses may be "na<nb", when the lenses are concave lenses.

When light passes from a medium with a higher refractive index to a medium with a lower refractive index, the light is refracted to a direction away from the normal line of the interface between the two media. When the relation between "na" and "nb" satisfies "na<nb", the incident light can be converged by using concave lenses.

BEST MODE FOR CARRYING OUT THE INVENTION

Preferred embodiments of the present invention will be described with reference to the drawings.

First Embodiment

FIGS. 1A–4B illustrate a method of manufacturing a microlens array substrate according to a first embodiment of the present invention.

Figure 1A:
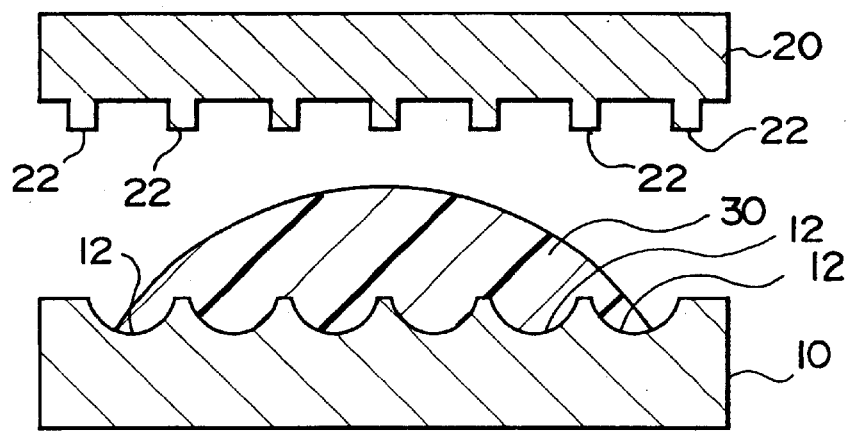
FIGS. 1A–1C illustrate a method of manufacturing a microlens array substrate according to a first embodiment of the present invention.

A first master mold 10 and a second master mold 20 shown in FIG. 1A are prepared. A plurality of curved surfaces 12 are formed on the first master mold 10. Each of the curved surfaces 12 has a concave shape that is an inverted shape of a convex lens. On the second master mold 20, a plurality of projections 22 are formed. These projections 22 form a black matrix as seen from a plan view (not shown).

The first and second master molds 10 and 20 are arranged such that the curved surfaces 12 face the projections 22 and each projection 22 avoids being positioned right above the center of each curved surface 12.

A substrate precursor 30 (first light transmitting layer precursor) is then closely placed between the master mold 10 and the master mold 20. The substrate precursor 30 is a material for a microlens array substrate 32 shown in FIG. 1C. Although the master mold 10 is placed under the master mold 20 in FIG. 1A, the master mold 20 may be placed under the master mold 10.

As the substrate precursor 30, various materials can be used without specific limitations insofar as the materials transmit light when formed into the microlens array substrate 32. It is preferable that the materials can be cured by applying energy. Such a material can be handled as a low-viscous liquid when forming the microlens array substrate 32. Therefore, the material can be easily filled into minute parts of the first and second master molds 10 and 20 at room temperature under normal pressure or under similar conditions.

As the energy, at least, either light or heat is preferably used. Therefore, a general-purpose exposure apparatus, baking furnace, or hot plate can be used, thereby reducing facility costs and space.

As examples of such a material, UV-curable resins can be given. As the UV-curable resins, acrylic resins are suitable.

The UV-curable acrylic resins which exhibit excellent transparency and are capable of being cured in a short period of time can be obtained by utilizing various commercially available resins or photosensitizers.

Specific examples of a main composition of the UV-curable acrylic resins include prepolymers, oligomers, monomers, and photopolymerization initiators.

Examples of prepolymers or oligomers include acrylates such as epoxy acrylates, urethane acrylates, polyester acrylates, polyether acrylates, and spiroacetal acrylates, methacrylates such as epoxy methacrylates, urethane methacrylates, polyester methacrylates, and polyether methacrylates, and the like.

Examples of monomers include monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl actrylate, isobornyl acrylate, dicyclopentenyl acrylate, and 1,3-butanediol acrylate, bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate, and polyfunctional monomers such as trimethylolpropane triacrylate, trimethylolpropane trimethacrylate, pentaerythritol triacrylate, and dipentaerythritol hexaacrylate.

Examples of photopolymerization initiators include radidal-generating compounds such as acetophenones such as 2,2-dimethoxy-2-phenylacetophenone, butylphenones such as α-hydroxyisobutylphenone and p-isopropyl-α-hydroxyisobutylphenone, acetophenone halides such as p-tert-butyldichloroacetophenone, p-tert-butyltrichloroacetophenone and α, α-dichloro-4-phenoxyacetophenone, benzophenones such as benzophenone and N,N-tetraethyl-4,4-diaminobenzophenone, benzyls such as benzyl and benzyl dimethyl ketal, benzoins such as benzoin and benzoin alkyl ether, oximes such as 1-phenyl-1,2-propanedione-2-(o-ethoxycarbonyl)oxime, xanthones such as 2-methylthioxanthone, and 2-chlorothioxanthone, and Michler's ketone.

Compounds such as amines may be added to prevent oxygen from inhibiting curing, and a solvent may be added for making application easy, as required.

As examples of the solvent, one or a plurality of organic solvents selected from various organic solvents such as propylene glycol monomethyl ether acetate, propylene glycol monopropyl ether, methoxymethyl propionate, ethoxyethyl propionate, ethyl cellosolve, ethyl cellosolve acetate, ethyl lactate, ethyl pyruvinate, methyl amyl ketone, cyclohexanone, xylene, toluene, butyl acetate, or mixed solvents of these organic solvents can be used without specific limitations.

A predetermined amount of the substrate precursor 30 formed by the UV-curable acrylic resin and the like is provided onto the master mold 10 as shown in FIG. 1A.

Figure 1B:
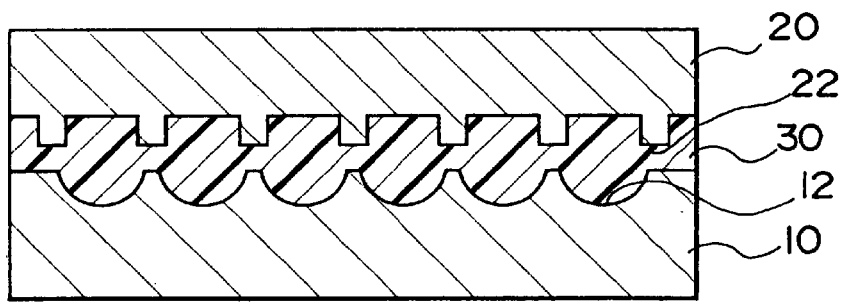
Figure 1C:
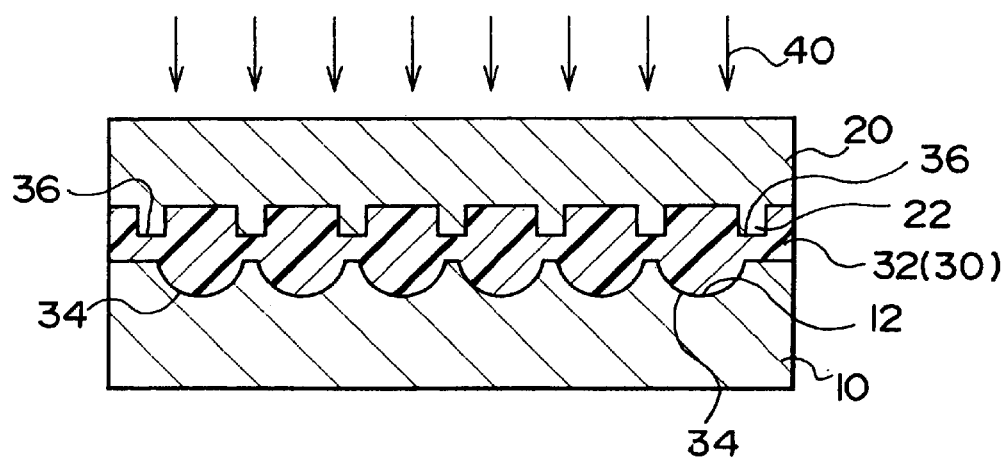

The substrate precursor 30 is spread to a predetermined area as shown in FIG. 1B and the substrate precursor 30 is cured by exposing to UV light 40 from at least one of the master mold 10 side and the master mold 20 side, as shown in FIG. 1C, to form the microlens array substrate 32 (first light transmitting layer) between the master molds 10 and 20. Lenses 34 formed by transferring the shapes of the curved surfaces 12 are provided on one side of the microlens array substrate 32, and a plurality of recesses 36 formed by transferring the shapes of the projections 22 are provided on the other side. The recesses 36 form a black matrix as seen from a plan view (not shown). Each recess 36 avoids being positioned right above the center of each lens 34.

When spreading the substrate precursor 30 to a predetermined area, pressure may be applied to either the master mold 10 or the master mold 20, or both, as required. Although the substrate precursor 30 is placed on the master mold 10 in this case, it may be placed on the master mold 20 or on both the master molds 10 and 20. Alternatively, the substrate precursor 30 may be applied to one or both of the master mold 10 and the master mold 20 by using a spin coating method, dipping method, spray coating method, roll coating method, bar coating method, or the like.

Figure 2A:
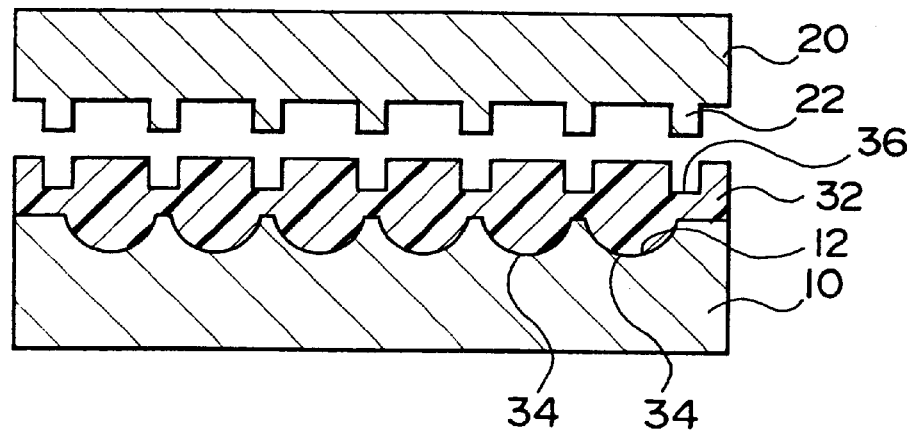
FIGS. 2A–2B also illustrate the method of manufacturing a microlens array substrate according to the first embodiment.

The master mold 20 is then removed from the microlens array substrate 32 to open the recesses 36 formed by transferring the shapes of the projections 22, as shown in FIG. 2A.

Figure 2B:
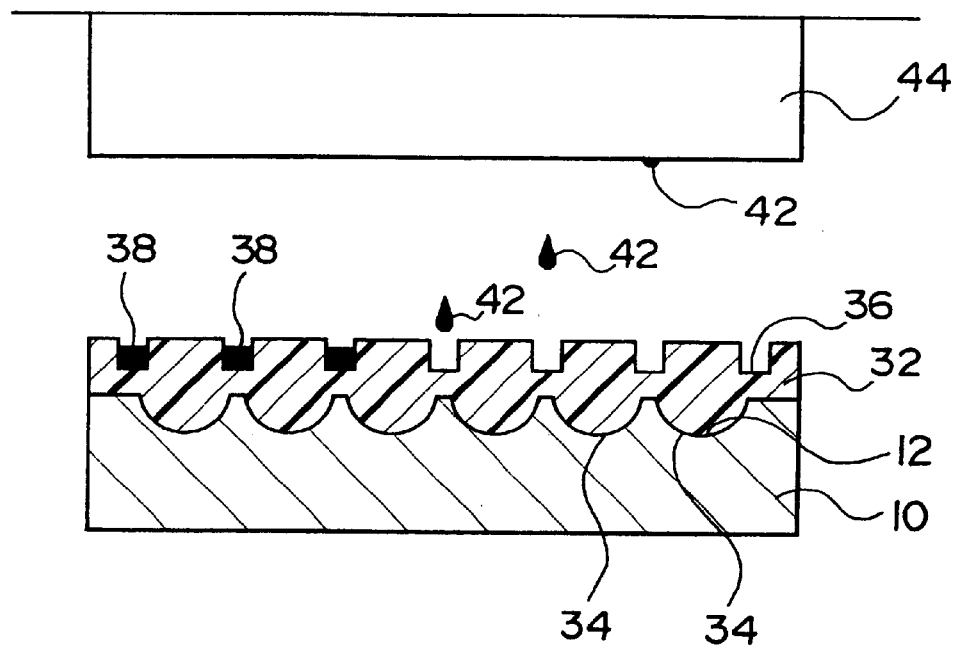

The recesses 36 of the microlens array substrate 32 are filled with a shading material 42 to form a shading layer 38, as shown in FIG. 2B. The shading layer 38 functions as a black matrix.

As the shading material 42, various materials can be used insofar as the materials do not transmit light and do exhibit durability. For example, materials in which a black dye or black pigment is dissolved in a solvent together with a binder resin are used as the shading material 42. As the solvent, water or various organic solvents can be used without specific limitations. As the organic solvents, one of the following organic solvents or a mixed solution of a plurality of solvents selected from these solvents may be used. Examples of these organic solvents include propylene glycol monomethyl ether acetate, propylene glycol monopropyl ether, methoxymethyl propionate, ethoxyethyl propionate, ethyl cellosolve, ethyl cellosolve acetate, ethyl lactate, ethyl pyruvinate, methyl amyl ketone, cyclohexanone, xylene, toluene, butyl acetate, or mixed solvents of these organic solvents can be used.

There are no specific limitations to a method of filling the recesses 36 with the shading material 42, but an ink jet method is preferable. By using the ink jet method, ink can be used at high speed as well as at low cost without any waste by applying a technique which has been put to practical use for ink jet printers.

FIG. 2B illustrates the process of filling the recesses 36 with the shading material 42 by an ink jet head 44. Specifically, the ink jet head 44 is placed so as to face the recesses 36 to jet the shading material 42 into each recess 36.

As examples of the ink jet head 44, ink jet heads which have been put to practical use for ink jet printers such as a piezo jet type of ink jet head which jets ink by applying pressure to ink by utilizing volumetric variation of a piezoelectric element or a type of ink jet head which jets ink by applying pressure produced by expanding the volume of ink or vaporizing ink by using an electrothermal energy conversion member as an energy-generating element. In these types, an injecting area and an injecting pattern can be optionally set.

In the present embodiment, the shading material 42 is jetted from the ink jet head 44. Therefore, it is necessary to ensure the fluidity of the shading material 42 to enable jetting from the ink jet head 44.

In order to fill the recesses 36 on the microlens array substrate 32 equally with the shading material 42, the filling position is adjusted by some operation such as moving the ink jet head 44. When the recesses are uniformly filled with the shading material, the filling process is completed. If a solvent component is included in the shading material 42, the shading material 42 is then heated to remove the solvent component. Note that the shading material 42 shrinks when the solvent component is removed. It is therefore necessary to provide a sufficient amount of the shading material 42 to keep the thickness for ensuring a required shading property after the shrinkage.

Figure 3A:
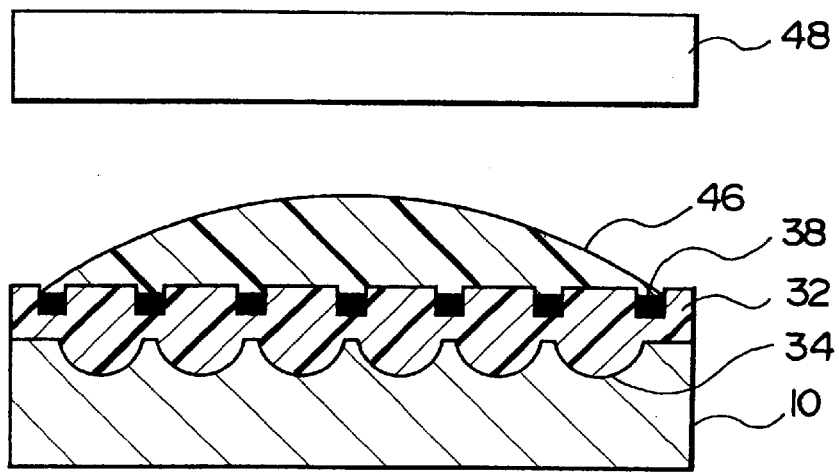
FIGS. 3A–3C also illustrate the method of manufacturing a microlens array substrate according to the first embodiment.

A protective film precursor 46 (adhesive layer precursor) is then dropped onto the microlens array substrate 32 as shown in FIG. 3A. A material for the protective film precursor 46 can be selected from the above-described materials which can be used for the substrate precursor 30. Then a reinforcing plate 48 is attached to the protective film precursor 46 to spread the protective film precursor 46. The protective film precursor 46 may be spread on the microlens array substrate 32 or on the reinforcing plate 48 by a method such as a spin coating or roll coating prior to the attachment of the reinforcing plate 48.

Although a glass substrate is usually used as the reinforcing plate 48, there is no specific limitation on the material of the reinforcing plate insofar as it has characteristics such as light transmissibility and mechanical strength. For example, substrates or film substrates made of plastics such as polycarbonate, polyallylate, polyether sulfone, amorphous polyolefin, polyethylene terephthalate, and polymethyl methacrylate can be used as the reinforcing plate 48.

Figure 3B:
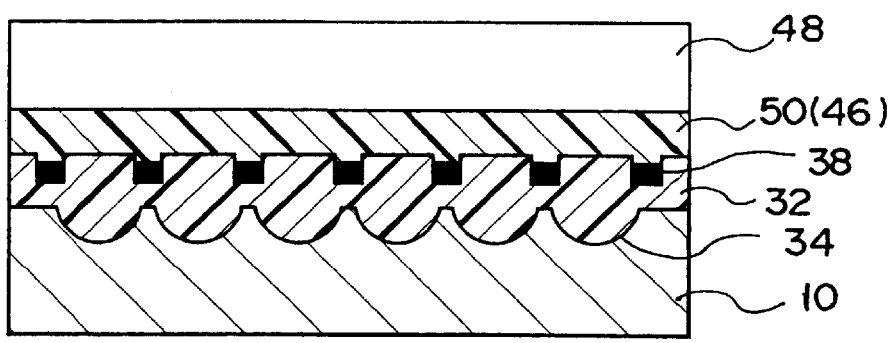

The protective film precursor 46 is then cured by a process suitable for the composition of the protective film precursor 46 to form a protective film 50 (adhesive layer), as shown in FIG. 3B. If a UV-curable acrylic resin is used, the protective film precursor 46 is cured by exposing to UV light under predetermined conditions.

Figure 3C:
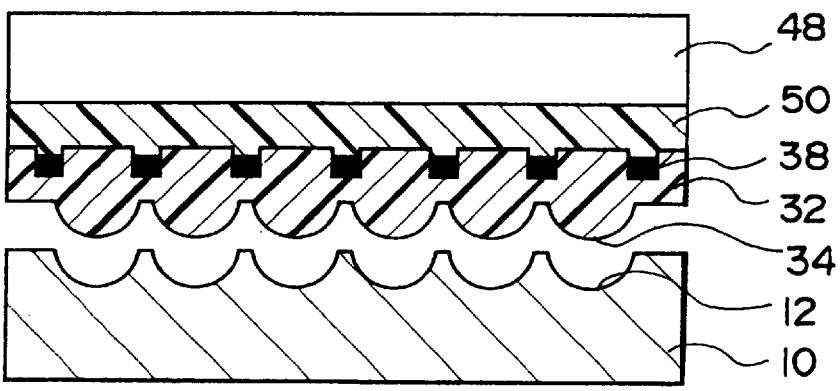

The master mold 10 is then removed from the microlens array substrate 32 as shown in FIG. 3C. The lenses 34 are formed on the microlens array substrate 32 by the curved surfaces 12 of the master mold 10. The lenses 34 are convex lenses.

Figure 4A:
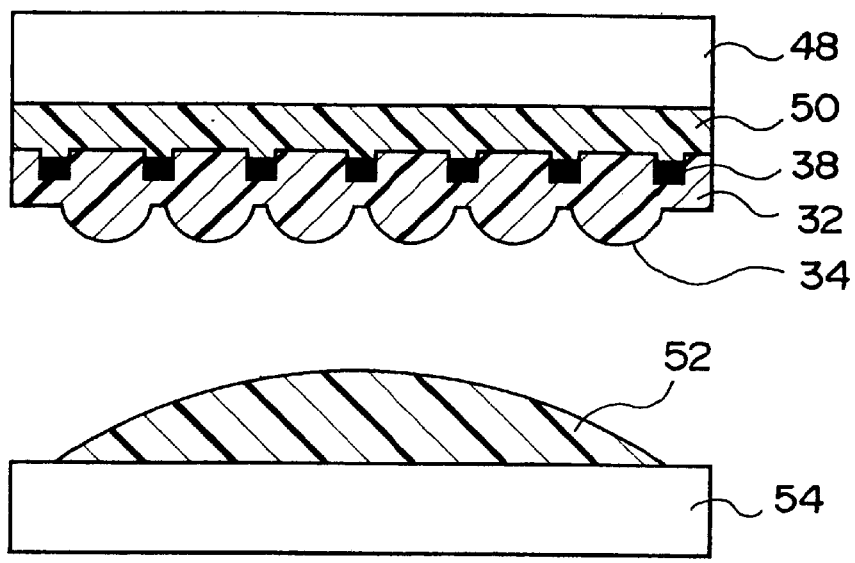
FIGS. 4A–4B also illustrate the method of manufacturing a microlens array substrate according to the first embodiment.

A protective film precursor 52 is closely placed between the lenses 34 of the microlens array substrate 32 and a reinforcing plate 54, as shown in FIG. 4A. This step is the same as the step shown in FIG. 3A and a material of the protective film precursor 52 (second light transmitting layer precursor) can be selected from the materials which can be used for the protective film precursor 46.

Figure 4B:
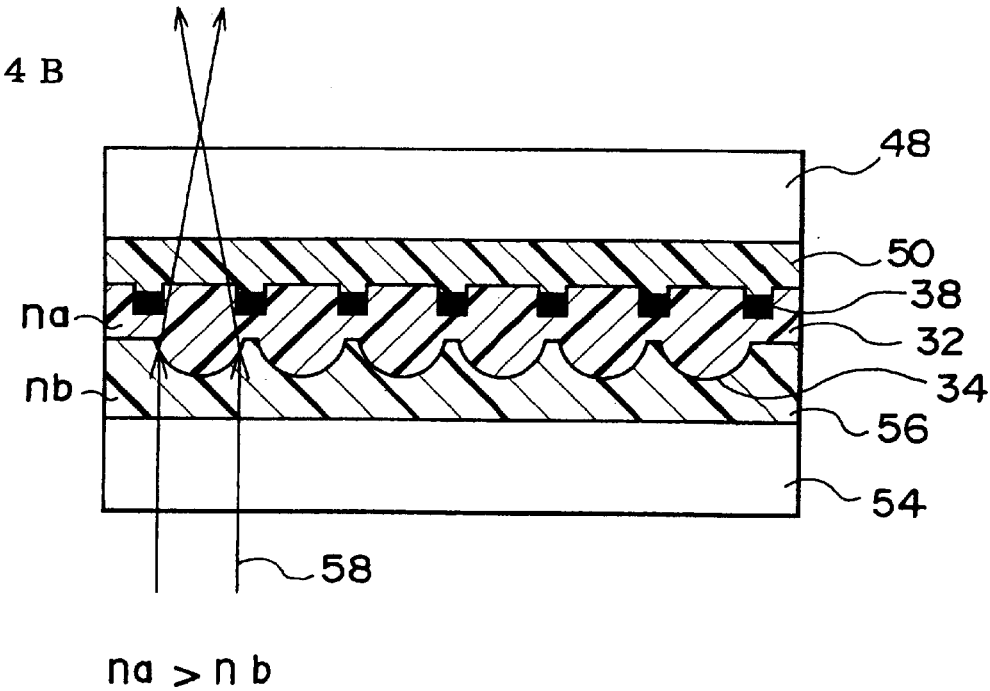

The microlens array substrate 32 with the protective films 50 and 56 and the reinforcing plates 48 and 54 formed on both sides as shown in FIG. 4B is thus produced. The microlens array substrate 32 converges incident light from the side of the lenses 34.

If the protective films 50 and 56 have characteristics required for the microlens array substrate such as mechanical strength, gas barrier characteristics, and chemical resistance, the reinforcing plates 48 and 54 are not needed. Moreover, if the microlens array substrate 32 itself exhibits sufficient strength and the shading layer 38 is not damaged, the protective films 50 and 56 can be omitted.

When the protective film 50 is formed, the following relation must be established between the light refractive index "na" of the microlens array substrate 32 and the light refractive index "nb" of the protective film precursor 52 forming the protective film 56 placed outside the lenses 34:

na>nb

Satisfying this condition makes it possible to pass the light from a medium having a lower refractive index to a medium having a higher refractive index. The light 58 is refracted and converged to a direction approaching the normal line of the interface between the two media to brightly illuminate the screen.

According to the present embodiment, the substrate precursor 30 is closely placed between the first and second master molds 10 and 20, and the lenses 34 are formed by transferring the shapes of the curved surfaces 12 of the first master mold 10. The microlens array substrate 32 having a plurality of the lenses 34 can be thus easily manufactured. According to this manufacturing method, the materials are used with high efficiency and the number of steps can be reduced, thereby reducing production costs. Moreover, because the first and second master molds 10 and 20 can be repeatedly used as long as durability permits, the step of producing these master molds can be omitted in the steps of manufacturing the second and subsequent microlens array substrates, thereby reducing the number of steps and production costs.

The recesses 36 are formed on the microlens array substrate by transferring the shapes of the projections 22 of the second master mold 20. The recesses 36 are filled with the shading material 42. The shading layer 38 formed of the shading material 42 functions as a black matrix to improve the contrast between pixels.

According to the present embodiment, the microlens array substrate capable of improving the contrast and illuminating the screen can be easily manufactured by transferring.

Second Embodiment

FIGS. 5A–6C illustrate a method of manufacturing a microlens array substrate according to a second embodiment of the present invention.

Figure 5A:
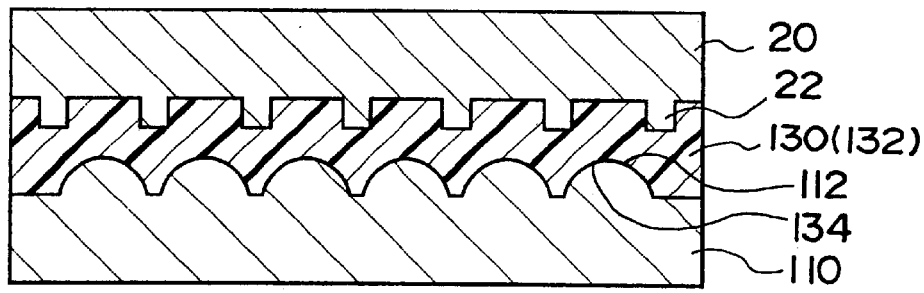
FIGS. 5A–5C illustrate a method of manufacturing a microlens array substrate according to a second embodiment of the present invention.

A substrate precursor 130 is closely placed between a first master mold 110 and the second master mold 20, as shown in FIG. 5A. Curved surfaces 112 are formed on the master mold 110. Each curved surface 112 has a convex shape that is an inverse of the shape of a concave lens. The present embodiment differs from the first embodiment in the shape of the curved surfaces 112. The master mold 20 is as same as in the first embodiment, and a material for the substrate precursor 130 can be selected from the materials used in the first embodiment. After the same step as in FIG. 1C, a microlens array substrate 132 is formed. Recesses 136 are formed on the microlens array substrate 132 by transferring the shapes of the projections 22 and lenses 134 are formed by transferring the shapes of the curved surfaces 112. The lenses 134 are concave lenses.

Figure 5B:
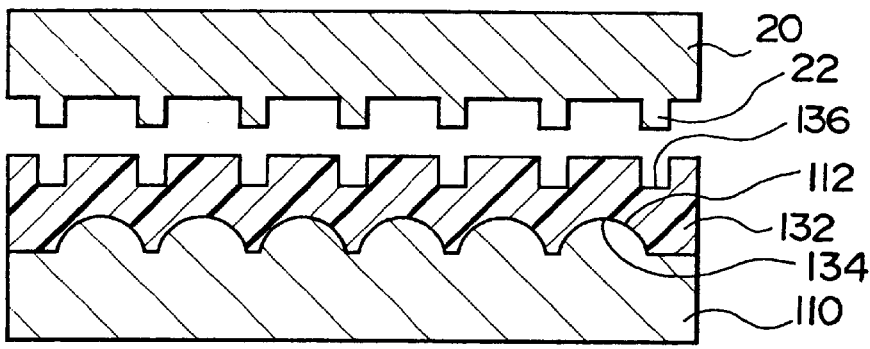
Figure 5C:
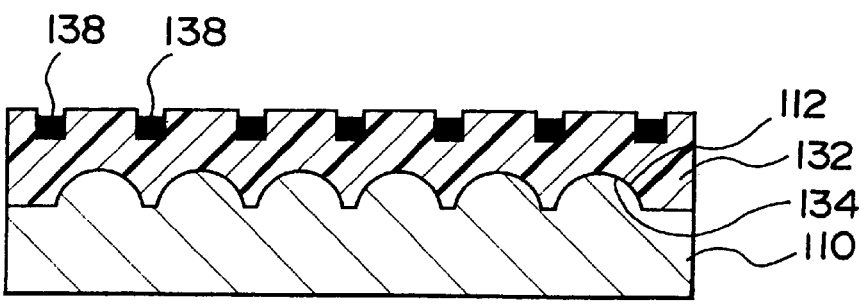

The second master mold 20 is then removed from the microlens array substrate 132 as shown in FIG. 5B, and the recesses 136 are filled with a shading material to form a shading layer 138, as shown in FIG. 5C. These steps are the same as the steps shown in FIGS. 2A and 2B.

Figure 6A:
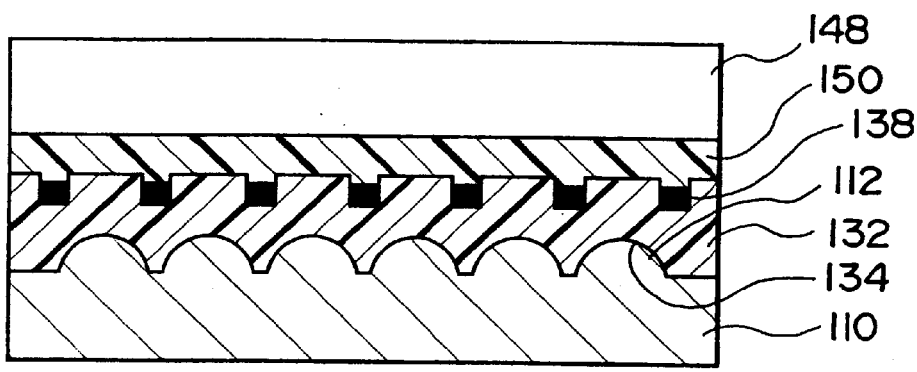
FIGS. 6A–6C also illustrate the method of manufacturing a microlens array substrate according to the second embodiment.
Figure 6B:
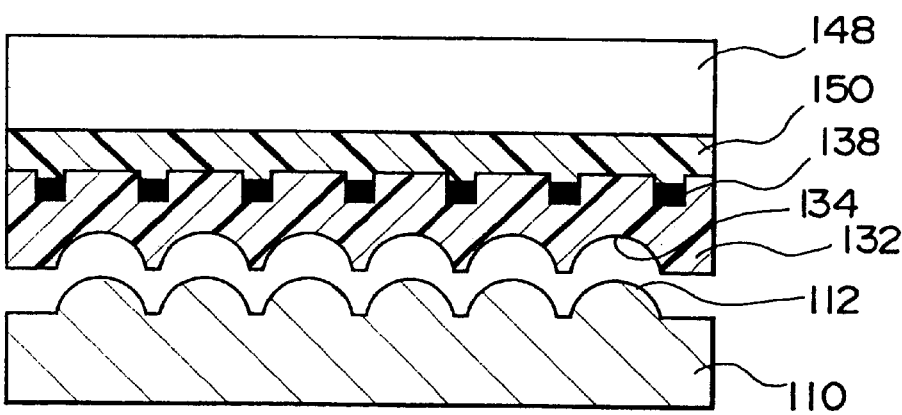

A protective film 150 (adhesive layer) formed by the protective film precursor (adhesive layer precursor) is formed between the surface of the microlens array substrate 132 having the shading layer 138 and a reinforcing plate 148, as shown in FIG. 6A. The first master mold 110 is then removed from the microlens array substrate 132, as shown in FIG. 6B. A protective film 156 (second light transmitting layer) and a reinforcing plate 154 are provided on the lenses 134 as in the step shown in FIG. 4A.

Figure 6C:
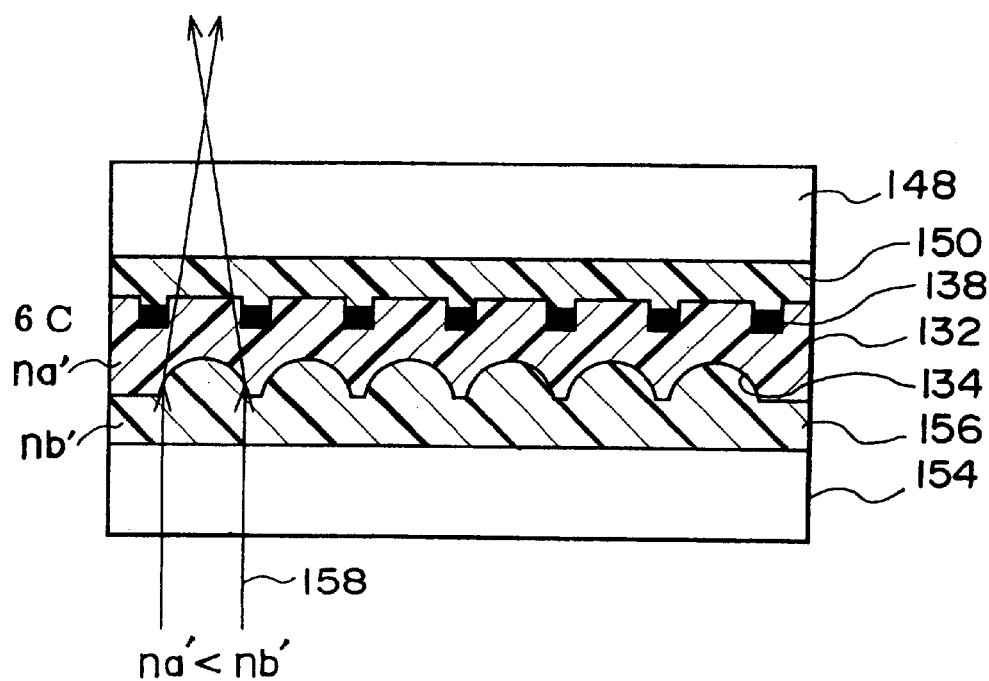

The microlens array substrate 132 with the protective films 150 and 156 and the reinforcing plates 148 and 154 formed on both sides as shown in FIG. 6C is thus manufactured by the above steps. The microlens array substrate 132 converges incident light from the side of the lenses 134.

This is based on the premise that the following relation must be established between the light refractive index. "na'" of the microlens array substrate 132 and the light refractive index "nb'" of the protective film precursor forming the protective film 156 placed outside the lenses 134:

na'<nb'

Satisfying this condition makes it possible to pass the light from a medium having a higher refractive index to a medium having a lower refractive index. Light 158 is refracted and converged to a direction away from the normal line of the interface between the two media to illuminate the screen.

Because the present embodiment differs from the first embodiment only in using the concave lenses instead of the convex lenses, the same effect as in the first embodiment can be achieved.

Third Embodiment

Figure 7:
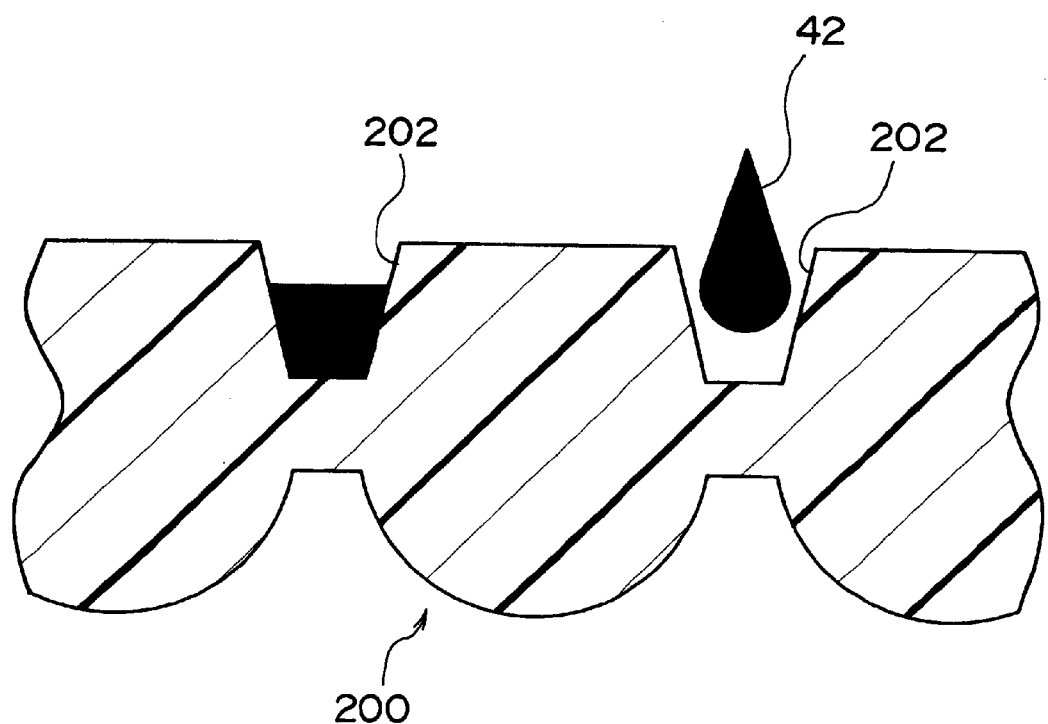
FIG. 7 illustrates a method of manufacturing a microlens array substrate according to a third embodiment of the present invention.

FIGS. 7–9B illustrate a method of manufacturing a microlens array substrate according to a third embodiment of the present invention. In the present embodiment, a microlens array substrate 200 shown in FIG. 7 is manufactured. The microlens array substrate 200 differs from the microlens array substrate 32 shown in FIG. 2B in the shape of recesses 202. Specifically, each recess 202 has a tapered side. Because the opening of the recess 202 is wider than the bottom, it can be reliably filled with the shading material 42 (see FIG. 2B) even if the pixels are densely arranged. A master mold with projections each having a trapezoid cross section is used to form the recesses 202.

FIGS. 8A–9B illustrate a process of forming a master mold used for forming the recesses 202.

Figure 8A:
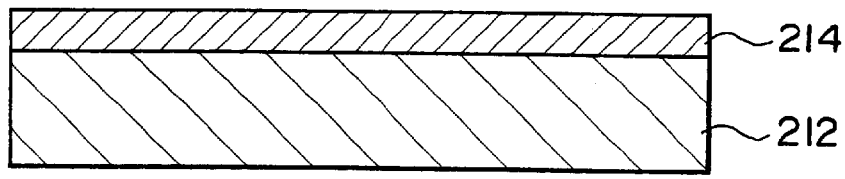
FIGS. 8A–8D also illustrate the method of manufacturing a microlens array substrate according to the third embodiment.

A resist layer 214 is formed on a base 212, as shown in FIG. 8A. The base 212 is formed into a master mold by etching the surface thereof. Although there are no specific limitations to the materials for the base 212 insofar as the materials can be etched, silicon or quartz is preferable because projections can be formed by etching with high precision.

As a material for forming the resist layer 214, for example, a commercially available positive resist which is normally used in the manufacture of a semiconductor device, and is obtained by compounding a diazonaphthoquinone derivative as a photosensitive agent with a cresol/novolak resin can be used. When the positive resist is exposed to radiation through a mask with a given pattern, the area exposed to radiation can be selectively removed by a developer.

As a method of forming the resist layer 214, a spin coating method, dipping method, spray coating method, roll coating method, bar coating method, or the like can be used.

Figure 8B:
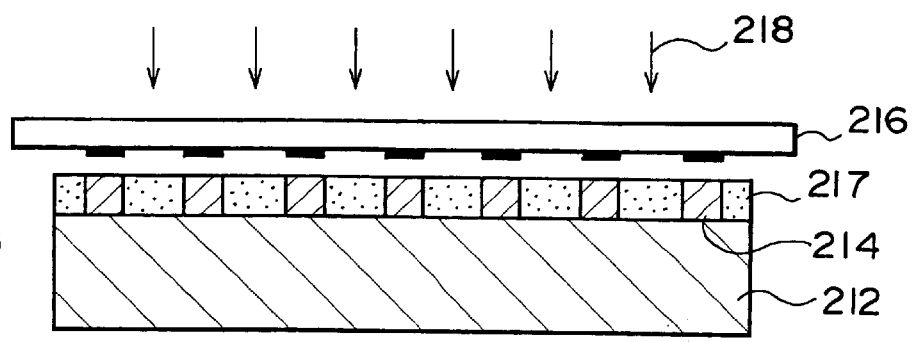

A mask 216 is then placed above the resist layer 214 and a predetermined area of the resist layer 214 is exposed to radiation 218 through the mask 216, as shown in FIG. 8B. The mask 216 has a pattern not to allow the areas required for the formation of projections 222 (see FIG. 9B) to be exposed to the radiation 218. Radiation shielding area of the mask 216 has a frame-like shape corresponding to the shape of a black matrix. The black matrix has a shape according to the pixel arrangement such as a mosaic arrangement, delta arrangement, or stripe arrangement.

As the radiation, light having a wavelength from 200 nm to 500 nm is preferable. If light having this wavelength range is used, photolithographic technology established in the manufacture of a liquid crystal panel and the facilities used for this technology can be utilized thereby reducing production costs.

Figure 8C:
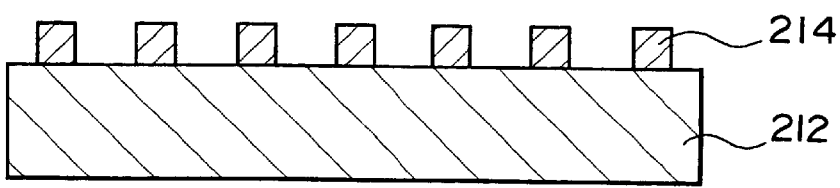

After the resist layer 214 is exposed to the radiation 218, the areas 217 exposed to the radiation 218 in the resist layer 214 are selectively removed by being developed under predetermined conditions, and part of the surface of the base 212 is exposed. The other part of the base is kept to be covered by the residual resist layer 214, as shown in FIG. 8C.

Figure 8D:
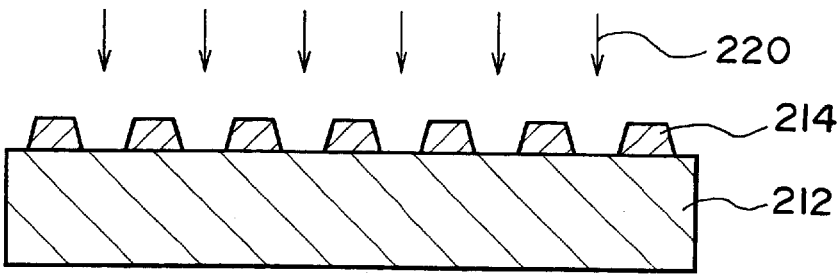

Each portion of the patterned resist layer 214 is softened by heating to be tapered at the side due to surface tension, as shown in FIG. 8D.

The base 212 is then etched to a predetermined depth by an etchant 220 using the remaining resist layer 214 as a mask, as shown in FIG. 8D. Specifically, dry etching such as anisotropy etching, for example, reactive ion etching (RIE) is performed.

Figure 9A:
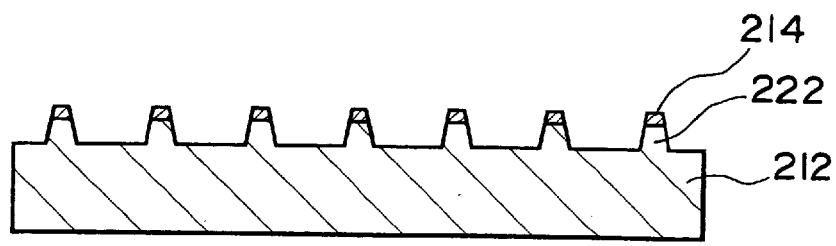
FIGS. 9A–9B also illustrate the method of manufacturing a microlens array substrate according to the third embodiment.
Figure 9B:
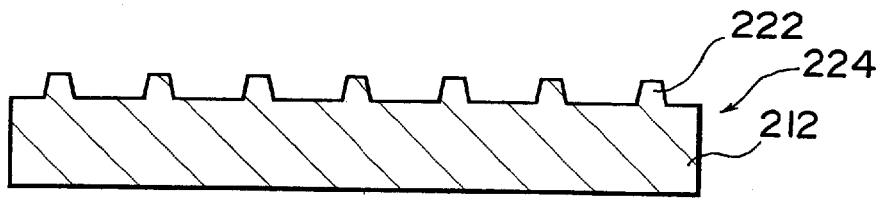

Since each portion of the remaining resist layer 214 is tapered at the side, as the resist layer 214 is gradually reduced in size by etching, the base 212 is gradually exposed. The exposed area is continuously etched. Because the base 212 is continuously and gradually etched, projections each having a trapezoidal cross section are formed on the base 212 after etching, as shown in FIG. 9A.

After removing the residual resist layer 214 oh the projections 222 if necessary, a master mold 224 is obtained.

According to the present embodiment, each of the projections 222 on the master mold 224 has a trapezoidal cross section. By using the master mold 224 instead of the master mold 20 shown in FIG. 1, the recesses 202 in which the side thereof is tapered so that the opening is wider than the bottom can be formed. The recesses 202 can be reliably and easily filled with the shading material 42. Therefore, the ink jet head can be controlled with ease and the manufacturing yield increases.

According to this embodiment, the master mold 224 is economical because it can be used repeatedly as long as durability permits. Moreover, the step of manufacturing the master mold 224 can be omitted in the manufacture of the second or subsequent microlens arrays, thereby reducing the number of steps as well as production costs.

In this embodiment, a positive resist is used for forming the recesses on the substrate 212. Alternatively, a negative resist may be used. When the negative resist is exposed to radiation through a mask with a given pattern, the areas exposed to the radiation are insolubilized, and the areas not exposed to the radiation can be selectively removed by a developer. In this case, a mask having a pattern which is the inverse of the pattern of the mask 216 is used. Alternatively, a resist may be directly exposed to laser beams or electron beams for patterning without using a mask.

If the side of the patterned resist layer 214 can be tapered as shown in FIG. 8D by adjusting the developing conditions, the step of heating the resist layer 214 may be omitted.

Figure 10:
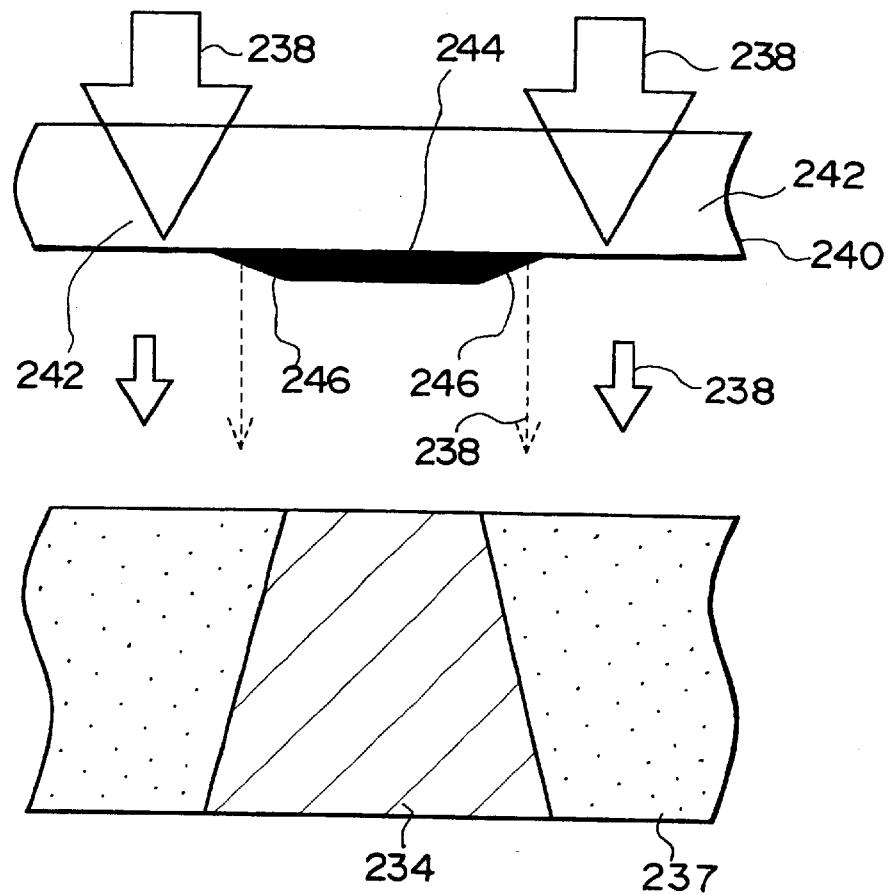
FIG. 10 illustrates a modification of a mask-used in the third embodiment.

FIG. 10 illustrates a modification of the mask. A mask 240 shown in FIG. 10 is a half-tone mask having a radiation transmitting area 242, radiation shielding area 244, and, semi-radiation transmitting area 246 for the radiation 238. The semi-radiation transmitting area 246 is formed so that the farther away from the radiation shielding area 244, the greater amount of the radiation 238 passes therethrough. The transmittance is changed by changing the thickness of the shielding material which forms the semi-radiation transmitting area 246 in FIG. 10. It is also possible to change the transmittance by changing shading of the semi-radiation transmitting area 246. By using the mask 240, the radiation 238 passes through the semi-radiation transmitting area 246 while being attenuated to expose the resist layer 234. Specifically, the radiation 238 passes through the radiation transmitting area 246 such that the attenuation factor becomes greater from the radiation transmitting area 242 to the shielding area 244. As a result, because degree of exposure to the radiation 238 decreases closer to the shielding area 244, the area 237 is exposed to the radiation and the resist layer 234 having a tapered side remains, as shown in FIG. 10. A resist layer having a tapered side can be thus formed in this manner.

Fourth Embodiment

Figure 11:
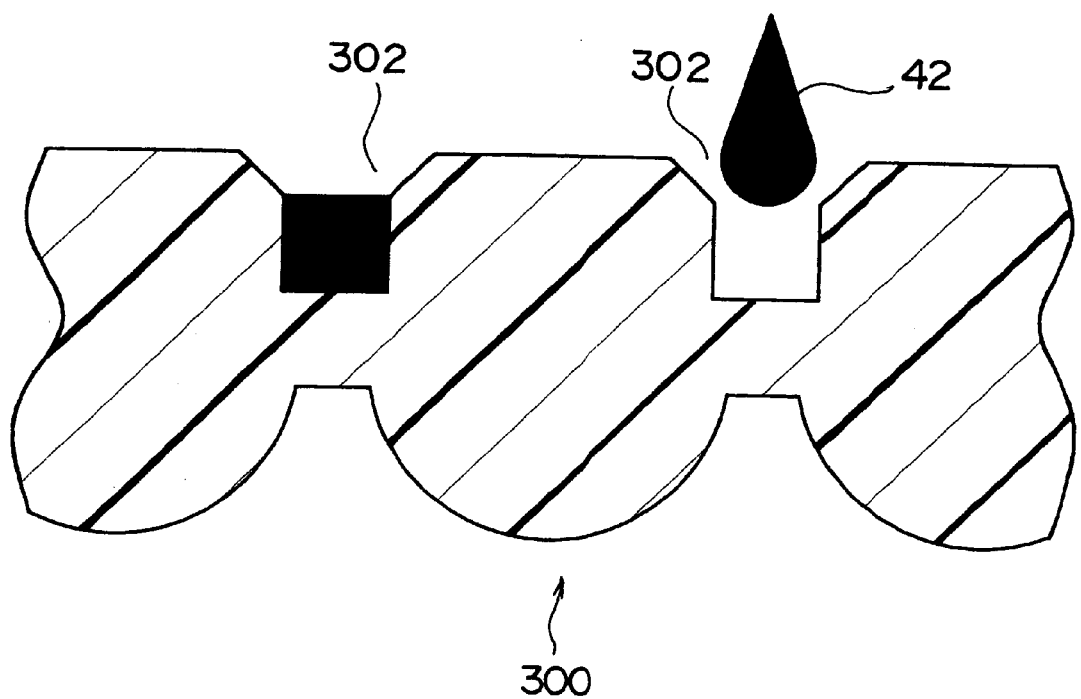
FIG. 11 illustrates a microlens array substrate according to a fourth embodiment of the present invention.

FIGS. 11–14C illustrate a microlens array substrate according to a fourth embodiment of the present invention and a method of manufacturing thereof. In the present embodiment, a microlens array substrate 300 shown in FIG. 11 is manufactured. The microlens array substrate 300 differs from the microlens array substrate 32 shown in FIG. 2B in the shape of recesses 302. Specifically, only the opening edge of the side of the recesses 302 is tapered. Because the opening of the recess 302 in which the opening edge is tapered is wider than the bottom, the recess can be reliably filled with the shading material 42 (see FIG. 2B), even if the pixels are densely arranged. A master mold having projections each having a tapered side at the base is used to form the recesses 202.

FIGS. 12A–14C illustrate a process of forming a master mold used for forming the recesses 302.

Figure 12A:
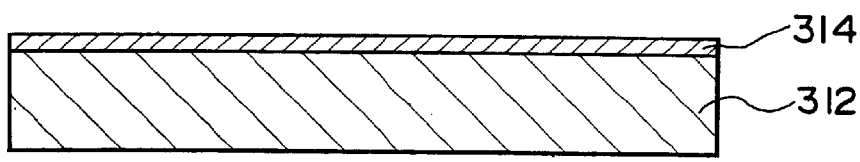
FIGS. 12A–12E illustrate a method of manufacturing a microlens array substrate according to the fourth embodiment.

A mask layer 314 is formed on a base 312 as shown in FIG. 12A. There are no specific limitations to the materials for the base 312 insofar as the materials can be etched, but silicon or quartz is preferable because etching can be easily performed with high precision.

As the mask layer 314, a material which can be firmly secured to the base 312 and difficult to be separated is preferable. For example, if the base 312 is formed of silicon, a silicon oxide film ($SiO_2$) formed by the thermal oxidation of the surface of the base 312 can be used as the mask layer 314. The mask layer 314 is thus firmly secured to the base 312. If the base 312 is formed of a metal, quartz, glass, or silicon, a film of any one of Al, Ni, Cr, W, Pt, Au, Ir, and Ti may be formed on the surface and used as the mask layer 314.

Figure 12B:
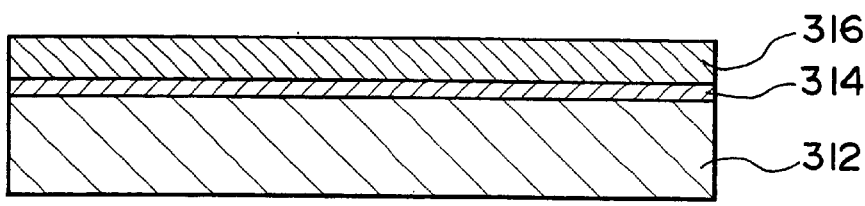

A resist layer 316 is then formed on the mask layer 314 on the base 312, as shown in FIG. 12B. As a material of the resist layer 316 and the formation method thereof, the materials and the formation method which can be applied to the third embodiment can be used.

Figure 12C:
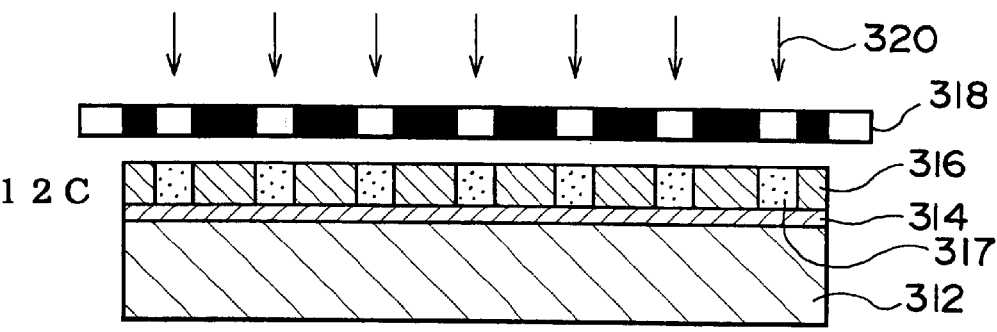

A mask 318 is placed above the resist layer 316 and a predetermined area of the resist layer 316 is exposed to radiation 320 through the mask 318, as shown in FIG. 12C. The mask 318 is patterned such that the radiation 320 passes through the area required for forming projections 334 of a master mold 332 (see FIG. 14C) which is finally manufactured. Radiation transmitting area of the mask 318 have a frame-like shape corresponding to the shape of a black matrix. The black matrix has a shape according to the pixel arrangement such as a mosaic arrangement, delta arrangement, or stripe arrangement. As the radiation, light having a wavelength from 200 nm to 500 nm is preferable.

Figure 12D:
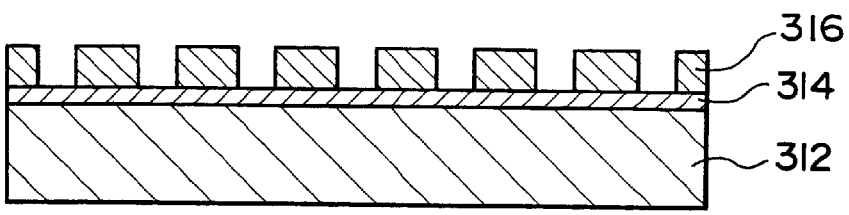

After the resist layer 316 is exposed to the radiation 320, the areas 317 exposed to the radiation 320 in the resist layer 316 are selectively removed by being developed under predetermined conditions to expose part of the surface of the mask layer 314, and the other part of the mask layer 314 is kept to be covered by the residual resist layer 316, as shown in FIG. 12D.

Figure 12E:
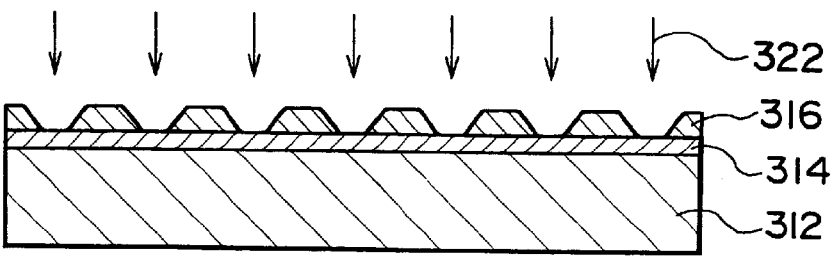

Each portion of the patterned resist layer 316 is softened by heating to be tapered at the side due to surface tension, as shown in FIG. 12E.

The mask layer 314 is then etched by an etchant 322 using the resist layer 316 with the tapered side as a mask, as shown in FIG. 12E. Specifically, dry etching such as anisotropy etching, for example, reactive ion etching (RIE) is performed.

Figure 13A:
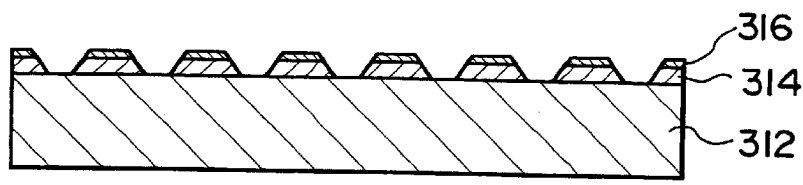
FIGS. 13A–13C also illustrate the method of manufacturing a microlens array substrate according to the fourth embodiment.

Since each portion of the remaining resist layer 316 is tapered at the side, as the resist layer 316 is gradually reduced in size by etching, the mask layer 314 is gradually exposed, and the exposed area is continuously etched. Because the mask layer 314 is thus continuously and gradually etched, the mask layer 314 is divided into portions each having a trapezoidal cross section, as shown in FIG. 13A. Part of the base 312 under the mask layer 314 is also exposed. Specifically, exposed part of the base 312 surrounds each portion of the mask layer 314. The exposed part has a frame-like shape corresponding to the shape of a black matrix. The black matrix has a shape according to the pixel arrangement such as a mosaic arrangement, delta arrangement, or stripe arrangement. It is preferable to terminate etching at the time when part of the surface of the base 312 is exposed.

Figure 13B:
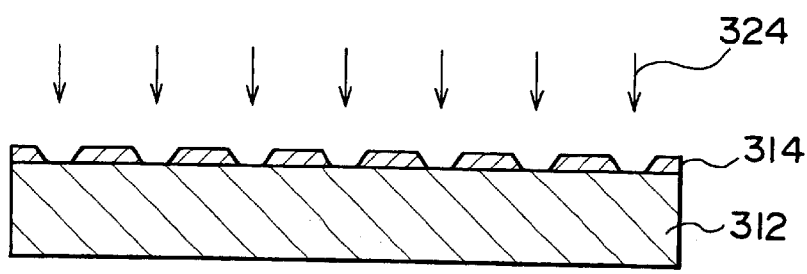

After removing the remaining resist layer 316 on the mask layer 314, if necessary, the exposed part of the base 312 is etched by an etchant 324, as shown in FIG. 13B.

In this case, the etching is high anisotropy etching in which etching proceeds perpendicularly to the surface of the base 312, and is highly selective etching in which the base 312 is etched but the mask layer 314 is scarcely etched.

Figure 13C:
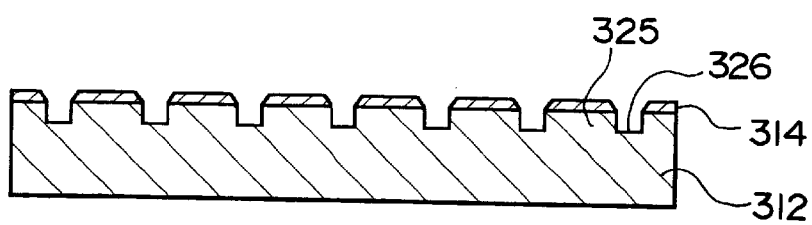

After etching, recesses 326 which are used for forming a master mold are formed in the base 312, as shown in FIG. 13C. The recesses 326 for forming a master mold have a frame-like shape corresponding to the shape of a black matrix. The black matrix has a shape according to the pixel arrangement such as a mosaic arrangement, delta arrangement, or stripe arrangement.

There are portions of the mask layer 314 each having a trapezoidal cross section on projections 325 surrounded by the recesses 326 for forming a master mold. The side of the projections 325 is vertical, and the side of each portion of the residual mask layer 314 is tapered. Therefore, the side of each recess 326 stand up vertically from the bottom and reversely-tapered at the opening edge so that its diameter gradually increased.

Figure 14A:
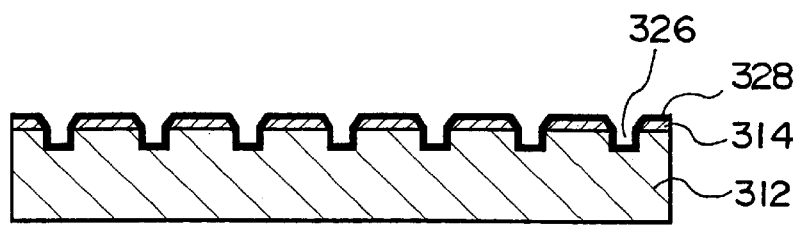
FIGS. 14A–14C also illustrate the method of manufacturing a microlens array substrate according to the fourth embodiment.

A metal film 328 is then formed to cover the surface of the base 312 on which the recesses 326 for forming a master mold are formed, as shown in FIG. 14A, thereby making the surface electrically conductive. The metal film 328 may be formed of, for example, nickel (Ni) with a thickness from 500 to 1000 angstroms ($10^{-10}$ m). The metal film 328 can be formed by various methods such as sputtering, CVD, vapor deposition, or electroless plating. If the surface of the base 312 exhibits conductivity required for forming a metal layer using an electroforming method in the subsequent step, the electro-conduction treatment is not required.

Figure 14B:
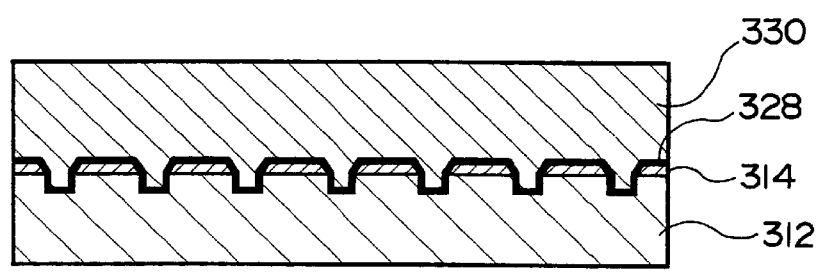

Ni is further electrodeposited by an electroforming method using the metal film 328 as a negative electrode and chip-like or globular Ni as a positive electrode to form a thick metal layer 330, as shown in FIG. 14B. An example of an electroplating solution is shown as follows.

| | |
|---|---|
| Nickel sulfamate | 550 g/l |
| Boric acid | 35 g/l |

| | |
|---|---|
| Nickel chloride | 5 g/l |
| Leveling agent | 20 mg/l |

Figure 14C:
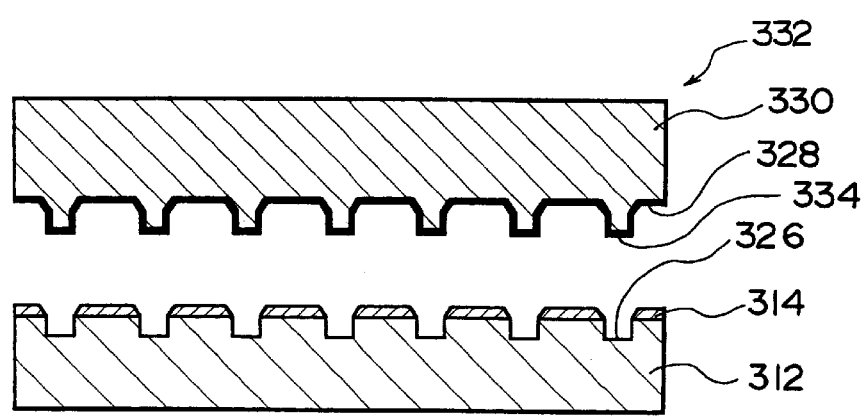

The metal film 328 and the metal layer 330 are removed from the base 312 as shown in FIG. 14C, followed by washing as required, to obtain a master mold 332. The metal film 328 may be removed from the master mold 332 by performing a removal treatment, as required On the master mold 332, there are projections 334 corresponding to the recesses 326 for forming a master mold of the base 312. Since the side of the recess 326 is reversely-tapered at the opening edge to increase the diameter gradually, the side of the projection 334 is tapered at the base and the diameter gradually becomes smaller in the direction toward the end.

According to the present embodiment, the projections 334 of the master mold 332 have the above-described shape. By using this master mold 332 instead of the master mold 20 in FIG. 1, the recesses 302 each having a side reversely-tapered to increase the diameter toward the opening edge can be formed. The recesses 302 can be filled with the shading material 42 reliably and easily. Therefore, the ink jet head can be controlled with ease and the manufacturing yield increases.

According to this embodiment, the master mold 332 is economical because it can be used repeatedly as long as durability permits. Moreover, the step of manufacturing the master mold 332 can be omitted in the manufacture of the second or subsequent microlens arrays, thereby reducing the number of steps as well as production costs.

Figure 15:
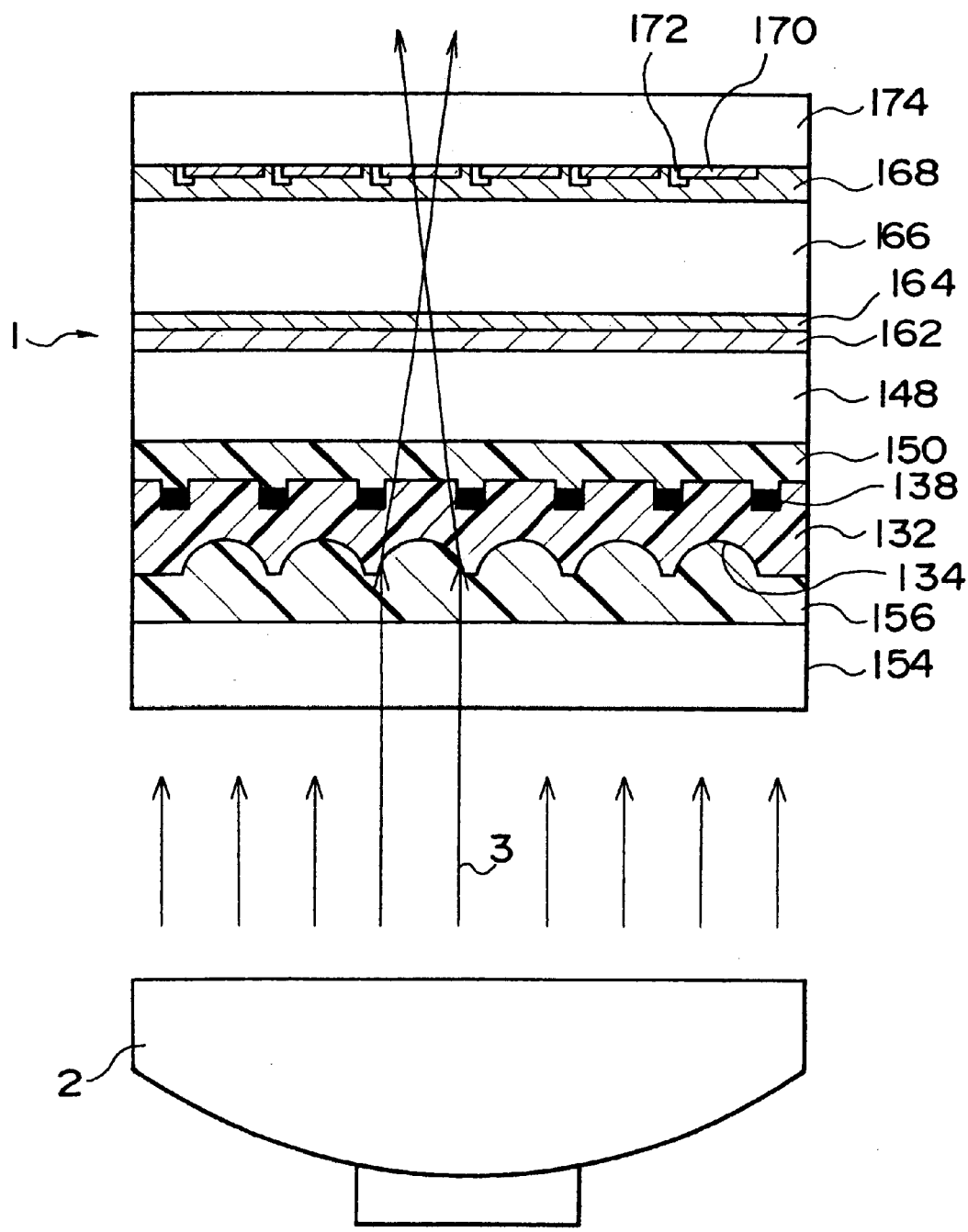
FIG. 15 illustrates a liquid crystal projector in which the microlens array substrate manufactured in accordance with the present invention is incorporated.

FIG. 15 illustrates part of a liquid crystal projector to which the present invention is applied. This liquid crystal projector comprises a light valve 1 into which the microlens array substrate 132 manufactured by the method according to the second embodiment is incorporated and a lamp 2 as a light source.

The microlens array substrate 132 is placed so that the lenses 134 are concave as seen from the lamp 2. A transparent common electrode 162 and an alignment film 164 are laminated on the reinforcing plate 148 on the side of the shading layer 138 as a black matrix.

A TFT substrate 174 is provided on the light valve 1 such that there is a gap between the TFT substrate 174 and the alignment film 164. A transparent discrete electrode 170 and a thin film transistor 172 are provided on the TFT substrate 174 and an alignment film 168 is formed thereon. The TFT substrate 174 is placed such that the alignment film 168 faces the alignment film 164.

A liquid crystal 166 is sealed between the alignment films 164 and 168 and is driven by applying voltage controlled by the thin film transistor 172.

This liquid crystal projector can display a bright image because light 3 emitted from the lamp 2 is converged on each pixel by each lens 134. Moreover, because the shading layer 138 functions as a black matrix, contrast between pixels can be improved.

What is claimed is:

1. A method of manufacturing a microlens array substrate comprising the steps of:

providing a substrate precursor between a first master mold having a plurality of curved surfaces and a second master mold having a plurality of projections to form a substrate having a plurality of lenses formed by the curved surfaces and recesses formed by the projections;

removing the first and second master molds from the substrate; and filling the recesses with a shading material after the second master mold is removed.

2. The method of manufacturing a microlens array substrate as defined in claim 1, wherein the substrate precursor is placed between the first and second master molds such that each of the projections is offset from the center of each of the curved surfaces.

3. The method of manufacturing a microlens array substrate as defined in claim 1, further comprising a step of forming a protective film by placing a protective film precursor on at least one of the shading material in the recesses and the lenses, and by solidifying the protective film precursor.

4. The method of manufacturing a microlens array substrate as defined in claim 3, wherein the protective film precursor is a material which can be cured by applying energy.

5. The method of manufacturing a microlens array substrate as defined in claim 4, wherein the energy is at least one of light and heat.

6. The method of manufacturing a microlens array substrate as defined in claim 5, wherein the protective film precursor is a UV-curable resin.

7. The method of manufacturing a microlens array substrate as defined in claim 3, wherein the protective film precursor is solidified after placing a reinforcing plate on the protective film precursor.

8. The method of manufacturing a microlens array substrate as defined in claim 1, wherein the substrate precursor is a material which can be cured by applying energy.

9. The method of manufacturing a microlens array substrate as defined in claim 8, wherein the energy is at least one of light and heat.

10. The method of manufacturing a microlens array substrate as defined in claim 9, wherein the substrate precursor is a UV-curable resin.

11. The method of manufacturing a microlens array substrate as defined in claim 1, wherein the recesses are filled with the shading material by an ink jet method.

12. The method of manufacturing a microlens array substrate as defined in claim 1, wherein at least part of an inner surface of each of the recesses is tapered such that an opening portion is wider than a bottom portion.

13. The method of manufacturing a microlens array substrate as defined in claim 12, wherein only the opening portion of the inner surface is tapered.

* * * * *